US012663781B2

(12) United States Patent (10) Patent No.: US 12,663,781 B2

Saijo (45) Date of Patent: Jun. 23, 2026

(54) NUMERICAL CONTROLLER

(71) Applicant: Fanuc Corporation, Minamitsuru-gun (JP)

(72) Inventor: Yoshinori Saijo, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 349 days.

(21) Appl. No.: 18/267,191

(22) PCT Filed: Jan. 13, 2022

(86) PCT No.: PCT/JP2022/000960

§ 371 (c)(1),
(2) Date: Jun. 14, 2023

(87) PCT Pub. No.: WO2022/154049

PCT Pub. Date: Jul. 21, 2022

(65) Prior Publication Data

US 2024/0012389 A1      Jan. 11, 2024

(30) Foreign Application Priority Data

Jan. 18, 2021      (JP) ................................. 2021-005801

(51) Int. Cl.
*G05B 19/4155* (2006.01)
*G05B 19/408* (2006.01)
(52) U.S. Cl.
CPC ....... *G05B 19/4155* (2013.01); *G05B 19/408* (2013.01)
(58) Field of Classification Search
None
See application file for complete search history.

(56) References Cited

U.S. PATENT DOCUMENTS 9,400,496 B2      7/2016   Haga et al.
2002/0082718 A1 *   6/2002   Amrhein ............ G05B 19/0426
700/11

(Continued)

FOREIGN PATENT DOCUMENTS

CN           112051804 A       12/2020
JP        2003108209 A   *   4/2003

(Continued)

OTHER PUBLICATIONS

International Search Report and Written Opinion for International Application No. PCT/JP2022/000960, dated Mar. 22, 2022, 8 pages.

(Continued)

*Primary Examiner* — David Earl Ogg
(74) *Attorney, Agent, or Firm* — BUCHANAN INGERSOLL & ROONEY PC

(57) ABSTRACT

A numerical controller includes a first processing unit configured to execute a first process of determining whether or not a control program includes a wait command, a second processing unit configured to execute a second process of determining whether or not a wait condition included in the wait command is satisfied when it is determined that the control program includes the wait command, and a third processing unit configured to execute a third process different from the first process and the second process in response to executing the second process within a period of the first control cycle.

4 Claims, 6 Drawing Sheets

(56) References Cited

U.S. PATENT DOCUMENTS

| | | | | |
|---|---|---|---|---|
| 2014/0088755 | A1* | 3/2014 | Haga .................... | G05B 19/408 700/190 |
| 2017/0329305 | A1 | 11/2017 | Shindou | |
| 2019/0079500 | A1* | 3/2019 | Nakano ............ | G05B 19/41835 |
| 2019/0137977 | A1* | 5/2019 | Sato .................... | G05B 19/418 |
| 2020/0387140 | A1 | 12/2020 | Shirai | |

FOREIGN PATENT DOCUMENTS

| | | | |
|---|---|---|---|
| JP | 2004-334914 | A | 11/2004 |
| JP | 2008-040542 | A | 2/2008 |
| JP | 2010-244280 | A | 10/2010 |
| JP | 2014063389 | A | 4/2014 |
| JP | 2017204188 | A | 11/2017 |
| KR | 10-2012-0020051 | A | 3/2012 |

OTHER PUBLICATIONS

Office Action (The First Office Action) issued Aug. 4, 2025, by the State Intellectual Property Office of People's Republic of China in corresponding Chinese Patent Application No. 202280008962.4 and an English translation of the Office Action. (17 pages).

* cited by examiner

FIG. 6

```
        •
        •
        •
N301 M100;
N302 #501=150.0;
N303 #500=#5001;
N304 IF [#500 LT #501] GOTO303;
N305 G01 Z100. F500;
        •
        •
        •
```

FIG. 7

```
        •
        •
        •
N401 #501=1.0;
N402 #500=#1000;
N403 IF [#500 NE #501] GOTO402;
N404 G01 Z100. F500;
        •
        •
        •
```

FIG. 8

CONTROL PROGRAM OF
FIRST SYSTEM

```
        •
        •
        •
N501 #501=150.0;
N502 #500=#20005001;
N503 WAITIF[#500 LT #501] GOTO502;
N504 G01 Z100. F500;
        •
        •
        •
```

CONTROL PROGRAM OF
SECOND SYSTEM

```
        •
        •
        •
N601 G01 X50.0 F500;
N602 G01 Y50.0;
N603 G01 X150.0;
N604 M01;
        •
        •
        •
```

NUMERICAL CONTROLLER

CROSS REFERENCE TO RELATED APPLICATIONS

This is the U.S. National Phase application of PCT/JP2022/000960, filed Jan. 13, 2022, which claims priority to Japanese Patent Application No. 2021-005801, filed Jan. 18, 2021, the disclosures of each of these applications being incorporated herein by reference in their entireties for all purposes.

FIELD OF THE INVENTION

The present disclosure relates to a numerical controller that controls an industrial machine.

BACKGROUND OF THE INVENTION

An industrial machine controls a plurality of axes based on a control program including a plurality of blocks. In this way, for example, the industrial machine can machine or install a workpiece, or convey a conveyed object.

A control program may include control commands such as an "IF" statement, a "WHILE" statement, and a "GOTO" statement (for example, see Patent Document 1). These control commands are used, for example, to define an operation of each axis of the industrial machine when a predetermined condition is satisfied or not satisfied. Since the operation of the industrial machine is defined depending on whether or not the predetermined condition is satisfied, these control commands are preferentially processed over a display control process, etc. that does not affect the operation of each axis.

In addition, a command for causing execution of a next command to be waited until a predetermined condition is satisfied using a control command may be written in a control program. For example, such a command is used to synchronously control an upper tool post and a lower tool post of a lathe.

PATENT DOCUMENT

Patent Document 1: JP 2017-204188 A

SUMMARY OF THE INVENTION

However, when the command causing execution of the next command to be waited until the predetermined condition is satisfied is written using, for example, an "IF" statement and a "GOTO" statement, a numerical controller does not recognize whether or not these commands are wait commands.

For this reason, many of CPU (Central Processing Unit) resources are consumed in repeatedly determining whether or not the predetermined condition is satisfied, and there is concern of occurrence of an event in which a process such as a display control process is delayed, etc.

An object of the disclosure is to provide a numerical controller capable of appropriately distributing CPU resources.

A numerical controller includes a first processing unit configured to execute a first process of determining whether or not a control program includes a wait command, a second processing unit configured to execute a second process of determining whether or not a wait condition included in the wait command is satisfied when it is determined that the control program includes the wait command, and a third processing unit configured to execute a third process different from the first process and the second process in a remaining period of a first control cycle in response to executing the first process and executing the second process within a period of the first control cycle.

According to an aspect of the disclosure, it is possible to appropriately distribute CPU resources.

BRIEF DESCRIPTION OF DRAWINGS

FIG. 6 is a diagram for describing an example of a wait command in a control program that operates a single system;

FIG. 7 is a diagram illustrating an example of a control program including a wait command;

FIG. 8 is a diagram illustrating an example of a control program including a wait command.

An embodiment of the disclosure will be described below with reference to the drawings. Note that not all combinations of characteristics described in the following embodiment are necessarily required to solve the problem. Further, more detailed description than necessary may be omitted. In addition, the following description of the embodiment and drawings are provided for those skilled in the art to fully understand the disclosure, and are not intended to limit the scope of the claims.

A numerical controller is a device for controlling an industrial machine. For example, the industrial machine is a machine used to machine a workpiece and convey a part. For example, the industrial machine is a machine tool or an industrial robot. In the present embodiment, a description will be given of an example of the numerical controller provided to the machine tool.

Figure 1:
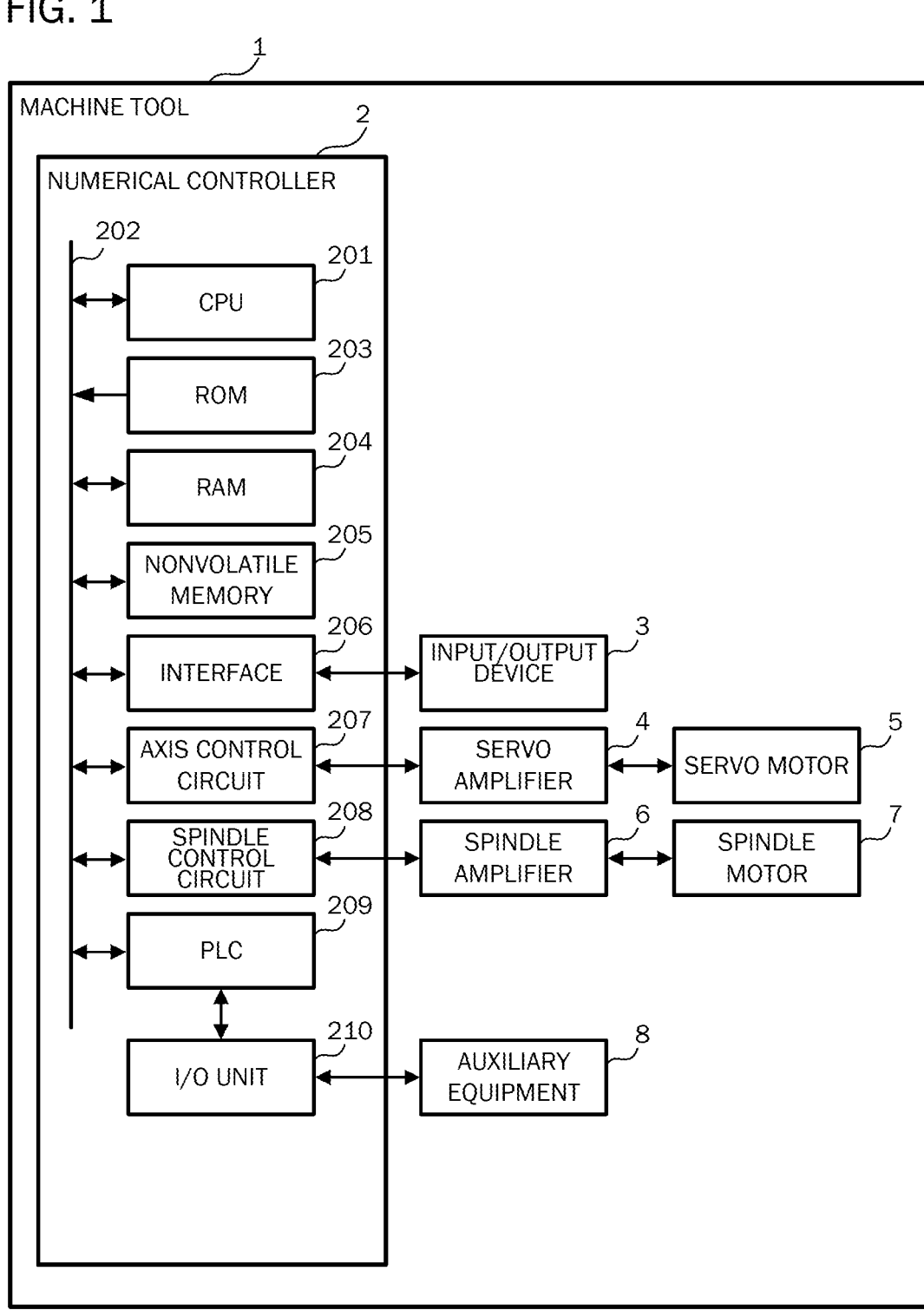
FIG. 1 is a diagram illustrating an example of a hardware configuration of a machine tool.

FIG. 1 is a diagram illustrating an example of a hardware configuration of the machine tool. The machine tool 1 is, for example, a lathe, a machining center, a multitasking machine, a drilling machine, or a tapping center. The machine tool 1 has, for example, a plurality of systems controlled by a plurality of mutually different control programs. The machine tool 1 having the plurality of systems is, for example, a lathe having two systems of an upper tool post and a lower tool post.

The machine tool 1 includes a numerical controller 2, an input/output device 3, a servo amplifier 4 and a servo motor 5, a spindle amplifier 6 and a spindle motor 7, and auxiliary equipment 8.

The numerical controller 2 is a device that controls the entire machine tool 1. The numerical controller 2 includes a CPU (Central Processing Unit) 201, a bus 202, a ROM (Read Only Memory) 203, a RAM (Random Access Memory) 204, and a nonvolatile memory 205.

The CPU 201 is a processor that controls the entire numerical controller 2 according to a system program. The CPU 201 reads a system program, etc. stored in the ROM 203 via the bus 202. In addition, the CPU 201 controls the servo motor 5 and the spindle motor 7 according to a machining program.

For example, the CPU 201 analyzes the control program and outputs a control command to the servo motor 5 at each predetermined control cycle.

The bus 202 is a communication path that connects respective pieces of hardware in the numerical controller 2 to each other. The respective pieces of hardware in the numerical controller 2 exchange data via the bus 202.

The ROM 203 is a storage device or storage medium that stores a system program, etc. for controlling the entire numerical controller 2.

The RAM 204 is a storage device that temporarily stores various data. The RAM 204 functions as a working area for the CPU 201 to process various data.

The nonvolatile memory 205 is a storage device that retains data even in a state where a power supply of the machine tool 1 is turned off and power is not supplied to the numerical controller 2. The nonvolatile memory 205 includes, for example, an SSD (Solid State Drive).

The numerical controller 2 further includes an interface 206, an axis control circuit 207, a spindle control circuit 208, a PLC (Programmable Logic Controller) 209, and an I/O unit 210.

The interface 206 connects the bus 202 and the input/output device 3 to each other. For example, the interface 206 sends various data processed by the CPU 201 to the input/output device 3.

The input/output device 3 is a device that receives various data via the interface 206 and displays the various data. In addition, the input/output device 3 receives input of various data and sends the various data to the CPU 201 via the interface 206. The input/output device 3 includes a display such as an LCD (Liquid Crystal Display), a keyboard, a mouse, etc. In addition, the input/output device 3 may be a touch panel.

The axis control circuit 207 is a circuit that controls the servo motor 5. The axis control circuit 207 receives a control command from the CPU 201 and outputs a command for driving the servo motor 5 to the servo amplifier 4. For example, the axis control circuit 207 sends a torque command for controlling the torque of the servo motor 5 to the servo amplifier 4.

The servo amplifier 4 receives a command from the axis control circuit 207 and supplies current to the servo motor 5.

The servo motor 5 is driven by being supplied with current from the servo amplifier 4. The servo motor 5 is connected to, for example, a ball screw that drives a tool post, a spindle head, and a table. By driving the servo motor 5, structures of the machine tool 1 such as the tool post, the spindle head, and the table move, for example, in an X-axis direction, a Y-axis direction, or a Z-axis direction.

The spindle control circuit 208 is a circuit for controlling the spindle motor 7. The spindle control circuit 208 receives a control command from the CPU 201 and outputs a command for driving the spindle motor 7 to the spindle amplifier 6. For example, the spindle control circuit 208 sends a torque command for controlling the torque of the spindle motor 7 to the spindle amplifier 6.

The spindle amplifier 6 receives a command from the spindle control circuit 208 and supplies current to the spindle motor 7.

The spindle motor 7 is driven by being supplied with current from the spindle amplifier 6. The spindle motor 7 is connected to a spindle to rotate the spindle.

The PLC 209 is a device that executes a ladder program to control the auxiliary equipment 8. The PLC 209 controls the auxiliary equipment 8 via the I/O unit 210.

The I/O unit 210 is an interface that connects the PLC 209 and the auxiliary equipment 8 to each other. The I/O unit 210 sends a command received from the PLC 209 to the auxiliary equipment 8.

The auxiliary equipment 8 is installed in the machine tool 1 to perform an auxiliary operation when the machine tool 1 machines a workpiece. The auxiliary equipment 8 may be a device installed around the machine tool 1. The auxiliary equipment 8 is, for example, a tool changer, a cutting fluid injection device, or an opening/closing door driving device.

Next, an example of functions of the numerical controller 2 will be described.

Figure 2:
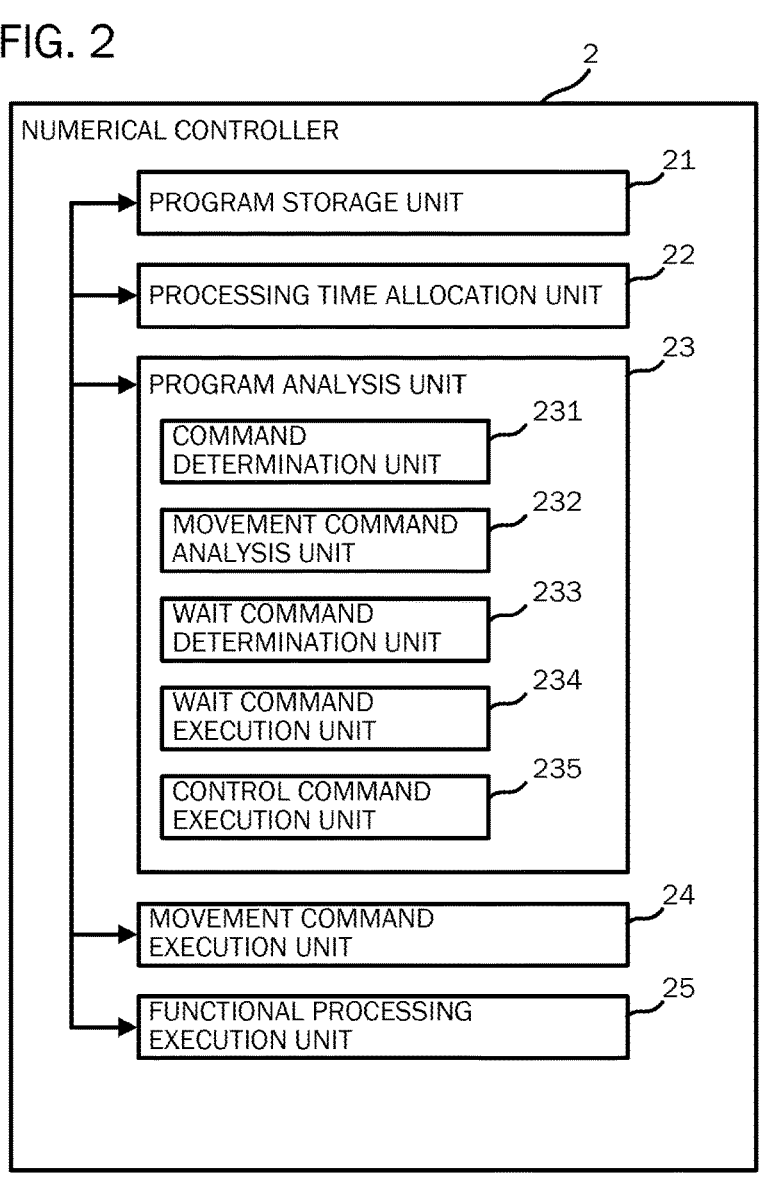
FIG. 2 is a block diagram illustrating an example of functions of a numerical controller.

FIG. 2 is a block diagram illustrating an example of the functions of the numerical controller 2. The numerical controller 2 includes a program storage unit 21, a processing time allocation unit 22, a program analysis unit 23, a movement command execution unit 24, and a functional processing execution unit 25.

The program storage unit 21 is realized by a control program input from the input/output device 3, etc. being stored in the RAM 204 or the nonvolatile memory 205.

For example, the processing time allocation unit 22, the program analysis unit 23, the movement command execution unit 24, and the functional processing execution unit 25 are realized by the CPU 201 performing arithmetic processing using a system program stored in the ROM 203 and a control program and various data stored in the nonvolatile memory 205. The CPU 201 executes arithmetic processing using the RAM 204 as a work area.

The program storage unit 21 stores a control program. The control program is a program for operating each part of the machine tool 1. The control program is, for example, a machining program. When the industrial machine is an industrial robot such as a manipulator, the control program is a program for operating the industrial robot.

The processing time allocation unit 22 allocates a partial period of each control cycle as a processing time to each of the program analysis unit 23, the movement command execution unit 24, the functional processing execution unit 25 etc. The processing time allocation unit 22 determines a processing time and a processing order of various types of processes to be executed within a period of one control cycle.

The processing time allocation unit 22 allocates a processing time to each unit so that processes are executed in descending order of priority among various types of processes within the period of each control cycle. A high-priority process is, for example, a movement process executed by the movement command execution unit 24.

The program analysis unit 23 reads a control program stored in the program storage unit 21 and executes an analysis process of the control program. The program analysis unit 23 analyzes a command written in each line of the control program. When the control program includes, for example, control programs of a first system and a second system, the program analysis unit 23 analyzes the control programs of the first system and the second system.

The program analysis unit 23 includes a command determination unit 231, a movement command analysis unit 232, a wait command determination unit 233, a wait command execution unit 234, and a control command execution unit 235.

The command determination unit 231 determines types of commands described in the control program. The types of commands include, for example, a movement command and a control command.

The movement command is a command for moving each axis of the machine tool 1. The movement command includes, for example, a positioning command designated by "G00", a linear interpolation command designated by "G01", and a circular interpolation command designated by "G02" or "G03".

The control command includes a command for directing a flow of an execution process of the control program, a command for setting a value in a memory of the numerical controller 2, a command for executing an operation on the memory, and a command for referring to a value stored in the memory. In other words, the control command refers to a command other than commands for controlling operations of various devices, such as a movement command, an auxiliary command, a display control command, or a communication control command.

For example, a memory reference command and a memory setting command designated by "If" are included in the control command. In addition, the control command includes a conditional branch command such as an "IF" statement, an iterative command such as a "FOR" statement and a "WHILE" statement, and a branch command such as a "GOTO" statement. In addition, the control command includes an arithmetic operation command for performing addition, subtraction, multiplication, and division defined by "+", "−", "*", and "/". In addition, the control command includes a logical operation command for executing a logical operation defined by "OR", "XOR", and "AND". In addition, the control command includes a function operation command for performing an operation of a function defined by "SIN", "SQRT", etc. In addition, the control command includes a wait command. The wait command will be described later in detail.

The movement command analysis unit 232 analyzes a movement command, and determines a type of movement command. For example, the movement command analysis unit 232 determines whether the movement command is any one of a positioning command, a linear interpolation command, and a circular interpolation command. In addition, coordinate values stated together with the movement command are analyzed to calculate a movement direction and a movement amount of an axis.

The wait command determination unit 233 determines whether or not the control command includes a wait command. In other words, the wait command determination unit 233 determines whether or not an analyzed control program includes a wait command. The wait command is a command for causing execution of a command following the wait command to be waited until a predetermined condition is not satisfied.

As will be described in detail later, for example, when one "IF" statement is repeatedly read the number of times set by a parameter, the wait command determination unit 233 determines that the "IF" statement is a wait command. That is, the wait command determination unit 233 detects that one "IF" statement is repeatedly read, and determines that this "IF" statement is a wait command.

When the control command includes a wait command, a command following the wait command, that is, a command to be executed subsequent to the wait command is not executed until a predetermined condition is not satisfied. This predetermined condition is hereinafter referred to as a wait condition.

For example, the wait command is used when an operation of an upper tool post is started after a lower tool post reaches a predetermined position designated by a control program in a lathe including the upper tool post and the lower tool post. A specific example of the wait command will be described later in detail with reference to the drawings.

When it is determined that the control program includes a wait command, the wait command execution unit 234 executes a process of determining whether or not a wait condition included in the wait command is satisfied. In other words, when it is determined that the control program includes the wait command, the wait command execution unit 234 executes the wait command.

The control command execution unit 235 executes a control command other than the wait command. That is, the control command execution unit 235 executes a control command such as an "IF" statement, a "WHILE" statement, or a "GOTO" statement to control a flow of an execution process of the control program. Alternatively, the control command execution unit 235 executes an arithmetic operation command, a logical operation command, a function operation command, etc.

The movement command execution unit 24 executes a movement process based on a movement command analyzed by the movement command analysis unit 232. The movement process is to execute control of each axis of the machine tool 1. The movement command execution unit 24 controls the servo motor 5 by supplying power to the servo amplifier 4. In this way, the operation of each axis of the machine tool 1 is controlled.

The functional processing execution unit 25 executes a process related to a function of the numerical controller 2 other than the analysis process of the control program and the movement process. For example, the process executed by the functional processing execution unit 25 includes a display process of displaying an operating state, etc. of the numerical controller 2, a control program editing process of executing an editing operation of the control program, and a communication process between the numerical controller 2 and the auxiliary equipment 8.

Next, a specific example of a wait command will be described.

Figure 3:
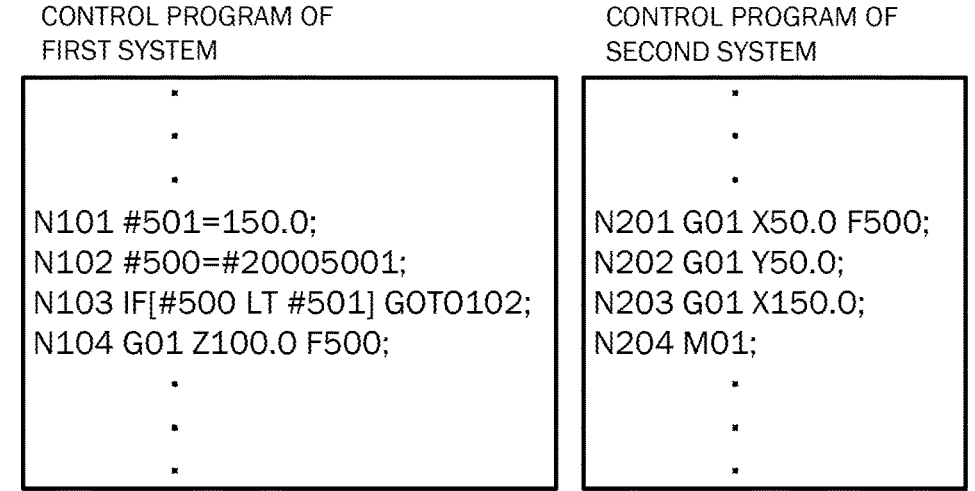
FIG. 3 is a diagram illustrating an example of a control program including a wait command.

FIG. 3 is a diagram illustrating an example of a control program including a wait command. A control program of a first system on the left is, for example, a control program for operating the upper tool post. A control program of a second system on the right is, for example, a control program for operating the lower tool post.

"#501=150.0" described in sequence number N101 is a memory setting command for substituting a value "150.0" into a variable "#501". "#500=#20005001" described in sequence number N102 is a memory reference command for substituting a value stored in a variable "#20005001" into a variable "#500". Here, the value stored in the variable "#20005001" is, for example, a coordinate value indicating a position of the lower tool post in the X-axis direction detected by a sensor (not illustrated) during operation of the lower tool post.

An "IF" statement described in sequence number N103 is a control command for determining whether or not a wait condition "#500 LT #501" is satisfied.

When a value stored in the variable "#500" is greater than or equal to a value stored in the variable "#501", the wait condition is not satisfied. In this case, an execution position of the control program shifts to sequence number N104 following the "IF" statement. "G01Z100.0F500" described in sequence number N104 is a command for moving the upper tool post to a position of "Z100.0" at a feed rate of "500".

When the value stored in the variable "#500" is less than the value stored in the variable "#501", the wait condition is satisfied. In this case, the execution position of the control program jumps to sequence number N102 by a "GOTO" statement, and the "IF" statement described in sequence number N103 is executed again. That is, the "IF" statement described in sequence number N103 causes execution of a command following the "IF" statement to wait until a wait condition is not satisfied.

The control program of the second system is a program for operating the lower tool post. "G01X50.0F500" described in sequence number N201 is a command for moving the lower tool post to a position of "X50.0" at a feed rate of "500". "G01Y50.0" described in sequence number N202 is a command for moving the lower tool post to a position of "Y50.0". "G01X150.0" described in sequence number N203 is a command for moving the lower tool post to a position of "X150.0". "M01" described in sequence number N204 is an optional stop command.

Therefore, the control program illustrated in FIG. 3 uses the wait command to cause the operation of the upper tool post to wait until the position of the lower tool post reaches "X150.0", and operates the upper tool post in the Z-axis direction when the position of the lower tool post reaches "X150.0".

Next, processes executed in each control cycle will be described.

Figure 4:
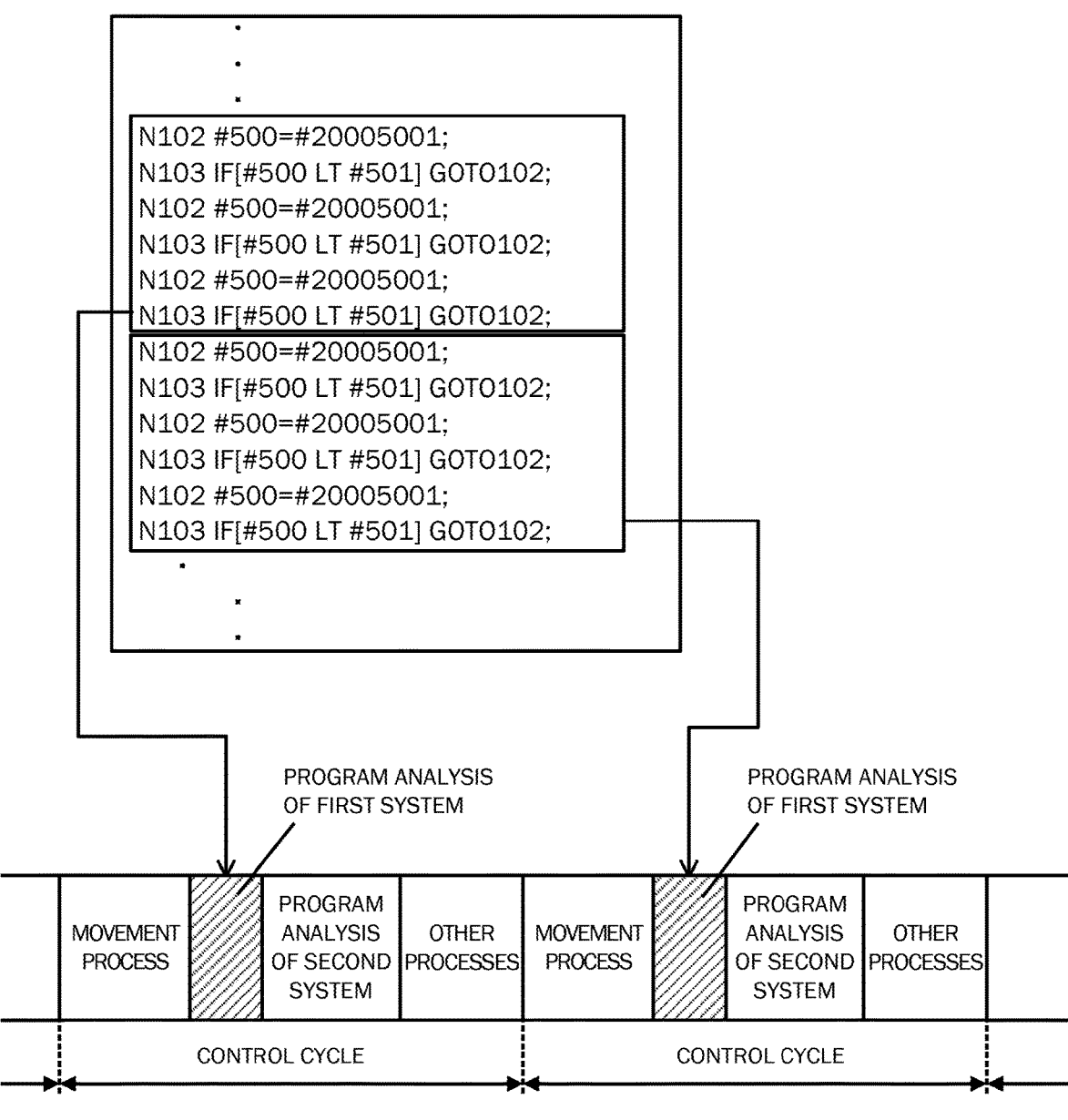
FIG. 4 is a diagram for describing processes executed in each control cycle.

FIG. 4 is a diagram for describing the processes executed in each control cycle by the numerical controller 2. Note that FIG. 4 illustrates processes when the numerical controller 2 executes the control program illustrated in FIG. 3.

A diagram on an upper side of FIG. 4 illustrates that an "IF" statement is repeatedly executed since a wait condition has not yet been satisfied. A time chart on a lower side of FIG. 4 illustrates processes executed for each control cycle. Arrows connecting the diagram on the upper side and the time chart on the lower side indicate that the wait command is executed in each control cycle.

As illustrated in FIG. 4, a movement process is allocated to a first period of one control cycle. That is, the processing time allocation unit 22 allocates the first period of the one control cycle to the movement command execution unit 24. The movement command execution unit 24 controls the operation of each axis of the machine tool 1 during a processing time allocated by the processing time allocation unit 22. For example, the movement command execution unit 24 controls the operation of each axis of the machine tool 1 based on an analysis result of a movement command analyzed in a previous control cycle and stored in a predetermined memory (not illustrated). When the control program includes the control program of the first system and the control program of the second system, the movement command execution unit 24 controls the operation of each axis included in the first system and the second system.

A period following the period allocated to the movement process is allocated to an analysis process of the control program of the first system. That is, the processing time allocation unit 22 allocates a processing time to the program analysis unit 23.

The program analysis unit 23 executes the analysis process of the control program of the first system during the allocated period.

Figure 5:
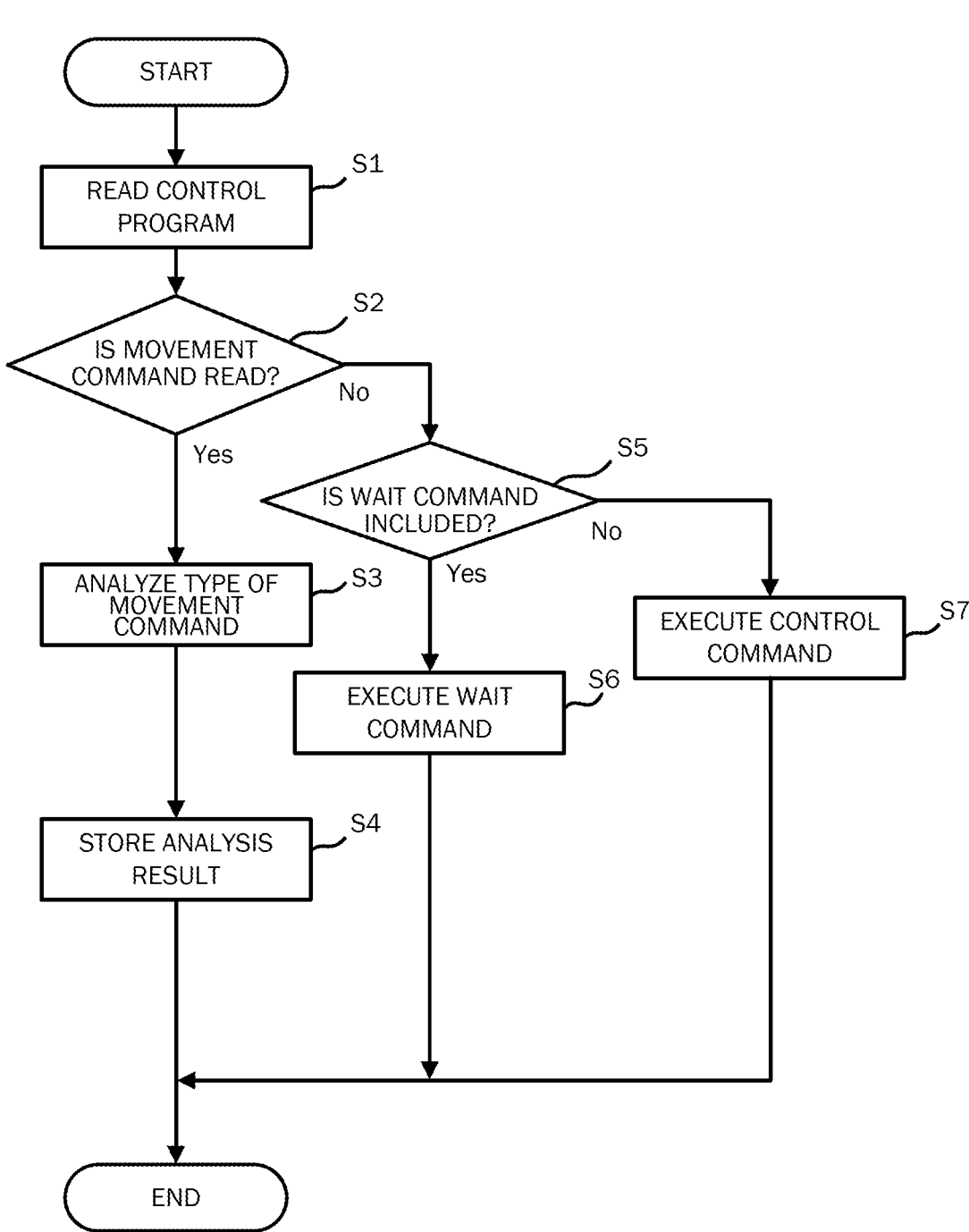
FIG. 5 is a flowchart illustrating an example of an analysis process executed by a program analysis unit.

FIG. 5 is a flowchart illustrating an example of the analysis process executed by the program analysis unit 23.

When the analysis process starts, the command determination unit 231 reads the control program (step S1), and determines whether or not the read command is a movement command (step S2).

When the read command is a movement command (Yes in step S2), the movement command analysis unit 232 analyzes a type of movement command (step S3). An analysis result of the movement command is stored, for example, in a memory (step S4).

When the read command is not a movement command (No in step S2), the wait command determination unit 233 determines whether or not the control command includes a wait command (step S5).

When one control command is repeatedly read the number of times set by a parameter, the wait command determination unit 233 determines that the control command includes a wait command. In the example illustrated in FIG. 4, when an "IF" statement described in sequence number N103 is read three times, the wait command determination unit 233 determines that the "IF" statement described in sequence number N103 is a wait command.

Note that the numerical controller 2 may include a reception unit that receives input of a parameter for defining the number of instances where the wait command is read within one control cycle. For example, the reception unit may include the input/output device 3. In addition, whether or not one "IF" statement is repeatedly executed may be determined by determining whether or not at least one of a sequence number of a block in which an "IF" statement is described, a jump destination of a "GOTO" statement, and a wait condition mutually matches the one in each execution process.

When the control command includes a wait command (Yes in step S5), the wait command execution unit 234 executes the wait command (step S6). That is, the wait command execution unit 234 executes a process of determining whether or not the wait condition included in the wait command is satisfied.

When the wait command execution unit 234 executes the wait command, the analysis process of the control program of the first system ends, and an analysis process of the control program of the second system is started. In other words, in response to determining whether or not the control program includes a wait command within a period of one control cycle and executing a process of determining whether or not the wait condition is satisfied, a process different from the process of determining whether or not the wait condition is satisfied is executed in a remaining period of the one control cycle. Furthermore, in other words, when the wait command is executed, the processing time allocation unit 22 allocates a remaining processing time in the one control cycle to a process different from an execution process of the wait command.

When the control command does not include a wait command (No in step S5), the control command execution unit 235 executes the control command (step S7).

When the control command ends, or the period allocated to the analysis processing of the control program of the first system elapses, the analysis process of the control program of the first system ends.

Here, description returns to FIG. 4. The analysis process of the control program of the second system is allocated to a period following the period allocated to the analysis process of the control program of the first system. That is, the processing time allocation unit 22 allocates a processing time to the program analysis unit 23.

In the allocated period, the command determination unit 231 reads a command of the control program of the second system, and determines a type of the command described in the control program of the second system. When the type of command is a movement command, the movement command analysis unit 232 analyzes a type of movement command, and stores an analysis result in a predetermined memory, for example. When the type of the command is a control command, the wait command determination unit 233 determines whether or not the control command includes a wait command.

When the control command includes a wait command, the wait command execution unit 234 executes the wait command. When the control command does not include a wait command, the control command execution unit 235 executes the control command. That is, in the analysis process of the control program of the second system, the same process as the analysis process of the control program of the first system is executed.

Other processes are allocated to a period following the period allocated to the analysis process of the control program of the second system. The other processes are, for example, processes other than the movement process, the analysis process of the control program of the first system, and the analysis process of the control program of the second system. That is, the processing time allocation unit 22 allocates a processing time to the functional processing execution unit 25. The functional processing execution unit 25 executes a display process, for example, during the allocated period.

When one control cycle ends, the same processes as the above-described processes are executed in a subsequent control cycle.

As described above, the numerical controller 2 includes a first processing unit that executes a first process of determining whether or not a control program includes a wait command, a second processing unit that executes a second process of determining whether or not a wait condition included in the wait command is satisfied when it is determined that the control program includes the wait command, and a third processing unit that executes a third process different from the first process and the second process in a remaining period of a first control cycle in response to executing the first process and executing the second process within a period of the first control cycle. Therefore, when it is determined that the control program includes the wait command, the numerical controller 2 does not repeatedly execute the wait command within the period of the first control cycle. For this reason, resources of the CPU 201 are not wasted for a wait command execution process, and the resources of the CPU 201 can be appropriately distributed. As a result, a process such as the display control process can be prevented from being delayed.

Note that the first processing unit corresponds to, for example, the wait command determination unit 233 of the present embodiment. Similarly, the second processing unit corresponds to the wait command execution unit 234. In addition, the third processing unit corresponds to the functional processing execution unit 25 and each unit of the program analysis unit 23 other than the wait command execution unit 234. In addition, the first control cycle corresponds to any one control cycle.

Further, when it is determined in the second process that the wait condition is satisfied, the second processing unit executes the second process within the period of the second control cycle following the first control cycle. That is, when it is determined in the second process that the wait condition is satisfied, the resources of the CPU 201 can be appropriately distributed by executing the second process in the second control cycle.

Further, when the control program includes a first conditional statement, and the first conditional statement is read the number of times set by a parameter within a period of the first control cycle, the first processing unit determines that the control program includes a wait command. Therefore, it is possible to easily determine whether or not a conventional control command includes a wait command. Note that the first conditional statement corresponds to, for example, an "IF" statement of the present embodiment.

Further, the numerical controller 2 further includes the reception unit that receives input of a value set in a parameter. For this reason, an operator can easily set a parameter in a factory.

In the above-described embodiment, an example of using the wait command in the control program of each of the first system and the second system has been described. However, as will be described below, the wait command may be used in a control program that operates a single system.

FIG. 6 is a diagram for describing an example of a wait command in a control program that operates a single system.

"M100" described in sequence number N301 is an auxiliary command for moving a tool post in a positive direction of an X-axis.

"#501=150.0" described in sequence number N302 is a memory setting command for substituting a value "150.0" into a variable "#501".

"#500=#5001" described in sequence number N303 is a memory reference command for substituting a value stored in a variable "#5001" into a variable "#500". The value stored in "#5001" is, for example, a coordinate value indicating a position of the tool post in the X-axis direction detected by a sensor (not illustrated).

An "IF" statement described in sequence number N304 is a control command for determining whether or not a wait condition "#500 LT #501" is satisfied.

When a value stored in the variable "#500" is greater than or equal to a value stored in the variable "#501", the wait condition is not satisfied. In this case, an execution position of the control program shifts to sequence number N305 subsequent to the "IF" statement.

Sequence number N305 is a command for moving the tool post to a position "Z100" at a feed rate of "500".

When a value stored in the variable "#500" is less than a value stored in the variable "#501", the wait condition is satisfied. In this case, a "GOTO" statement causes the execution position of the control program to jump to sequence number N302, and the "IF" statement described in sequence number N303 is executed again. In other words, the "IF" statement described in sequence number N303 is a wait command for causing execution of a command following the "IF" statement to wait until the wait condition is not satisfied.

Therefore, the control program illustrated in FIG. 6 uses the wait command to wait for the position of the tool post reaching "X150.0", and moves the tool post to "Z100" at a feed rate of "500" after the position of the tool post reaches "X150.0".

When this control program is executed, the "IF" statement is read only the number of times set by a parameter in each control cycle. The number of times set by the parameter is, for example, three times. In this way, the numerical controller 2 can prevent repeated execution of the wait command after determining whether or not the control program includes the wait command within a period of one control cycle. For this reason, resources of the CPU 201 can be prevented from being excessively wasted for the wait command execution process, and resources of the CPU 201 can be appropriately distributed. As a result, a process such as the display control process can be prevented from being delayed.

In the above-described embodiment, a description has been given of an example in which a wait command is used in a control program that operates a single system. Additionally, the wait command may be used to monitor auxiliary equipment 8 as described below.

FIG. 7 is a diagram for describing an example of using a wait command to monitor the auxiliary equipment 8.

"#501=1.0" described in sequence number N401 is a memory setting command for substituting a value "1.0" into a variable "#501".

"#500=#1000" described in sequence number N402 is a memory reference command for substituting a value stored in a variable "#1000" into a variable "#500". The value stored in "#1000" is, for example, data indicating a state signal of the auxiliary equipment 8. For example, a value "1.0" can be substituted into the variable "#1000" when a closing operation of an opening/closing door of the machine tool 1 is completed.

An "IF" statement described in sequence number N403 is a control command for determining whether or not a wait condition "#500 NE #501" is satisfied.

When a value stored in the variable "#500" matches a value stored in the variable "#501", the wait condition is not satisfied. In this case, an execution position of a control program shifts to sequence number N404 subsequent to the "IF" statement.

"G01Z100F500" described in sequence number N404 is a command for moving the tool post to a position of "Z100" at a feed rate of "500".

When the value stored in the variable "#500" does not match the value stored in the variable "#501", the wait condition is satisfied. In this case, a "GOTO" statement causes the execution position of the control program to jump to sequence number N402, and the "IF" statement described in sequence number N403 is executed again. In other words, the "IF" statement described in sequence number N403 is a wait command that causes execution of a command following the "IF" statement to wait until the wait condition is not satisfied.

Therefore, for example, the control program illustrated in FIG. 7 waits until the opening/closing door is closed, and moves the tool post to the position of "Z100" at a feed rate of "500" after the opening/closing door is closed.

When this control program is executed, the "IF" statement is read only the number of times set by a parameter in each control cycle. The number of times set by the parameter is, for example, three times. In this way, the numerical controller 2 can prevent the wait command from being repeatedly executed after determining whether or not the control program includes the wait command within a period of one control cycle. For this reason, most of the resources of the CPU 201 are not wasted for the wait command execution process, and the resources of the CPU 201 can be appropriately distributed. As a result, a process such as the display control process can be prevented from being delayed.

In the above-described embodiment, it is determined whether or not the "IF" statement has been read a number of times set by the parameter, and it is determined whether or not the "IF" statement is a wait command. However, the wait command may be predefined as described below.

FIG. 8 is a diagram illustrating an example of a control program including a predefined wait command. A control program of a first system on a left side of FIG. 8 is, for example, a control program for operating the upper tool post. A control program of a second system on a right side of FIG. 8 is, for example, a control program for operating the lower tool post. The control program of the first system includes a wait command "WAITIF" for causing an operation of the upper tool post to be waited until a wait condition is not satisfied.

"#501=150.0" described in sequence number N501 is a memory setting command for substituting a value "150.0" into a variable "#501". "#500=#20005001" described in sequence number N502 is a memory reference command for substituting a value stored in a variable "#20005001" into a variable "#500". Here, the value stored in "#20005001" is, for example, a coordinate value indicating a position of the lower tool post in the X-axis direction detected by a sensor (not illustrated) during operation of the lower tool post.

"WAITIF" of sequence number N503 is a predefined wait command. The wait command includes a wait condition "#500 LT #501". In other words, a process of sequence number N504 subsequent to "WAITIF" is not executed until the wait condition "#500 LT #501" is not satisfied.

When a value stored in "#500" is smaller than "#501", the wait condition is satisfied. In this case, a "GOTO" statement causes an execution position of the control program to jump to sequence number N502.

When the value stored in "#500" is greater than or equal to "#501", the wait condition is not satisfied. In this case, the execution position of the control program shifts to sequence number N504 subsequent to the wait command.

The control program of the second system is a program for operating the lower tool post. "G01X50.0F500" described in sequence number N601 is a command for moving the lower tool post to "X50.0" at a feed rate of "500". "G01Y50.0" described in sequence number N602 is a command for moving the lower tool post to a position of "Y50.0". "G01X150.0" described in sequence number N603 is a command for moving the lower tool post to the position of "X150.0". "M01" described in sequence number N604 is an optional stop command.

That is, the control program illustrated in FIG. 8 is a program for causing an operation of the upper tool post to wait until the lower tool post reaches "X150.0", and operating the upper tool post in the Z-axis direction when the lower tool post reaches "X150.0".

Next, processes executed by the numerical controller 2 in each control cycle will be described.

Figure 9:
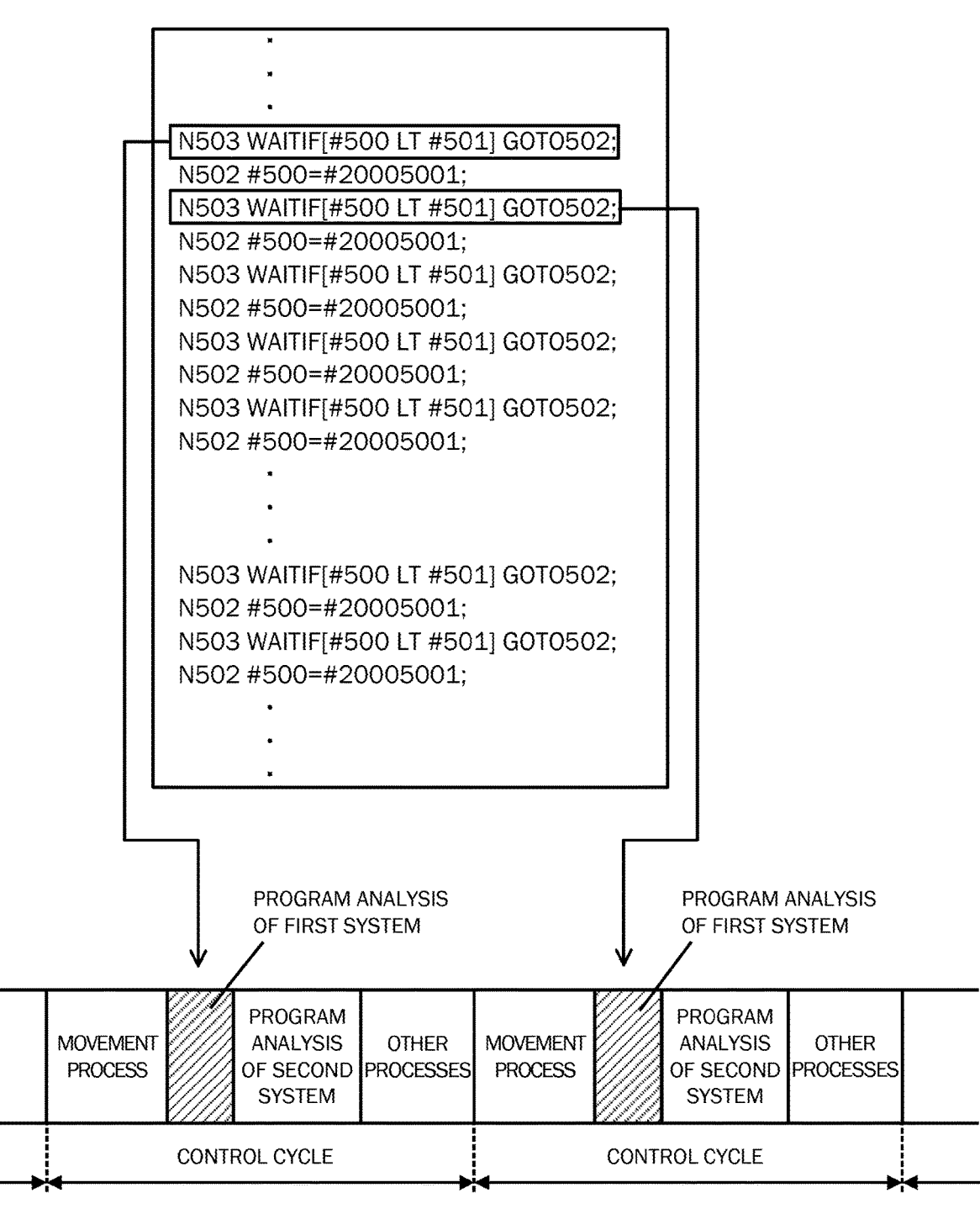
FIG. 9 is a diagram for describing processes executed in each control cycle.

FIG. 9 is a diagram for describing the processes executed by the numerical controller 2 in each control cycle. Note that FIG. 9 illustrates processes when the numerical controller 2 executes the control program illustrated in FIG. 8. A diagram on an upper side of FIG. 9 illustrates that a wait command is repeatedly executed since a wait condition has not yet been satisfied. A time chart on a lower side of FIG. 9 illustrates processes executed for each control cycle. Arrows connecting the diagram on the upper side and the time chart on the lower side indicate that the wait command is executed in each control cycle. That is, the wait command is executed one time in each control cycle.

As illustrated in FIG. 9, a movement process is allocated to a first period of one control cycle. That is, the processing time allocation unit 22 allocates a first processing time of the one control cycle to the movement command execution unit 24. The movement command execution unit 24 controls the operation of each axis of the machine tool 1 during a processing time allocated by the processing time allocation unit 22. For example, the movement command execution unit 24 controls the operation of each axis of the machine tool 1 based on an analysis result of a movement command analyzed in a previous control cycle and stored in a predetermined memory (not illustrated). When the control program includes a control program of a first system and a control program of a second system, the movement command execution unit 24 controls an operation of each axis included in the first system and the second system.

A program analysis process of the first system is allocated to a period following the first period allocated to the movement process. That is, the processing time allocation unit 22 allocates a processing time to the program analysis unit 23.

During the allocated period, the command determination unit 231 reads a command of the control program of the first system, and determines a type of command described in the control program of the first system. When the type of command is a movement command, the movement command analysis unit 232 analyzes a type of movement command, and stores an analysis result in a predetermined memory, for example. When the type of the command is a control command, the wait command determination unit 233 determines whether or not the control command includes a wait command. When the control command includes a wait command, the wait command execution unit 234 executes the wait command. When the control command does not include a wait command, the control command execution unit 235 executes the control command.

A program analysis process of the second system is allocated to a period following the period allocated to the program analysis process of the first system. That is, the processing time allocation unit 22 allocates a processing time to the program analysis unit 23. In an analysis process of the control program of the second system, the same process as the analysis process of the control program of the first system is executed.

Processes other than the movement process, the program analysis process of the first system, and the program analysis process of the second system are allocated to a period following the period allocated to the program analysis process of the second system. That is, the processing time allocation unit 22 allocates a processing time to the functional processing execution unit 25. The functional processing execution unit 25 executes, for example, a display process in the allocated period.

When one control cycle ends, the same processes as the above-described processes are executed in a subsequent control cycle.

As described above, the first processing unit determines that the control program includes a wait command when the control program includes a second conditional statement. That is, by defining, for example, a "WAITIF" statement as the wait command, the wait command determination unit 233 can easily determine whether or not the control program includes the wait command. Moreover, when it is determined that the control program includes the wait command, it is possible to prevent the wait command from being repeatedly executed within a period of the first control cycle.

EXPLANATIONS OF LETTERS OR NUMERALS

1 MACHINE TOOL
2 NUMERICAL CONTROLLER
201 CPU

202 BUS
203 ROM
204 RAM
205 NONVOLATILE MEMORY
206 INTERFACE
207 AXIS CONTROL CIRCUIT
208 SPINDLE CONTROL CIRCUIT
209 PLC
210 I/O UNIT
21 PROGRAM STORAGE UNIT
22 PROCESSING TIME ALLOCATION UNIT
23 PROGRAM ANALYSIS UNIT
231 COMMAND DETERMINATION UNIT
232 MOVEMENT COMMAND ANALYSIS UNIT
233 WAIT COMMAND DETERMINATION UNIT
234 WAIT COMMAND EXECUTION UNIT
235 CONTROL COMMAND EXECUTION UNIT
24 MOVEMENT COMMAND EXECUTION UNIT
25 FUNCTIONAL PROCESSING EXECUTION UNIT
3 INPUT/OUTPUT DEVICE
4 SERVO AMPLIFIER
5 SERVO MOTOR
6 SPINDLE AMPLIFIER
7 SPINDLE MOTOR
8 AUXILIARY EQUIPMENT

The invention claimed is:

1. A numerical controller comprising:
a first processing unit configured to execute a first process of determining whether or not a control program includes a wait command;
a second processing unit configured to execute a second process of determining whether or not a wait condition included in the wait command is satisfied when it is determined that the control program includes the wait command; and
a third processing unit configured to execute a third process different from the first process and the second process in a remaining period of a period of a first control cycle in response to executing the first process and executing the second process within the period of the first control cycle,
wherein, when the control program includes a first conditional statement, the first conditional statement is read a number of times set by a parameter within the period of the first control cycle, and the first processing unit determines that the wait command is included in the control program.

2. The numerical controller according to claim 1, wherein, when it is determined that the wait condition is satisfied in the second process, the second processing unit does not execute the second process during the remaining period of the first control cycle, and executes a next second process in a period of a second control cycle following the period of the first control cycle.

3. The numerical controller according to claim 1, further comprising a reception unit configured to receive input of a value set in the parameter.

4. The numerical controller according to claim 1, wherein the control program further includes a predetermined second conditional statement different from the first conditional statement, and wherein, in the second conditional statement, the first processing unit determines that the control program includes the wait command.

* * * * *